T. B. SMITH.
SPRING WHEEL.
APPLICATION FILED MAR. 31, 1913.

1,102,205.

Patented June 30, 1914.

Inventor
T. B. SMITH.

Witnesses
Robert M. Sutphen.
A. J. Hind.

By Watson E. Coleman
Attorney

UNITED STATES PATENT OFFICE.

THOMAS B. SMITH, OF BENTON, ILLINOIS.

SPRING-WHEEL.

1,102,205.

Specification of Letters Patent.

Patented June 30, 1914.

Application filed March 31, 1913. Serial No. 757,949.

*To all whom it may concern:*

Be it known that I, THOMAS B. SMITH, a citizen of the United States, residing at Benton, in the county of Franklin and State of Illinois, have invented certain new and useful Improvements in Spring-Wheels, of which the following is a specification, reference being had to the accompanying drawings.
This invention relates to new and useful improvements in spring wheels and more particularly to a wheel of this character, which is especially adapted for use in place of the pneumatic and rubber tire wheels in use at the present time, the object of the invention being to provide a spring wheel which will absorb all shock and jar when passing over rough and uneven roads.

Another object of the invention is to provide a spring wheel of the above character which will possess advantages in points of efficiency and durability, is inexpensive of manufacture and at the same time is simple in construction and operation.
With the above and other objects in view, my invention consists in the novel features of construction and the combination and arrangement of parts to be hereinafter more fully described, pointed out in the claims and shown in the accompanying drawings, in which—

Figure 1:
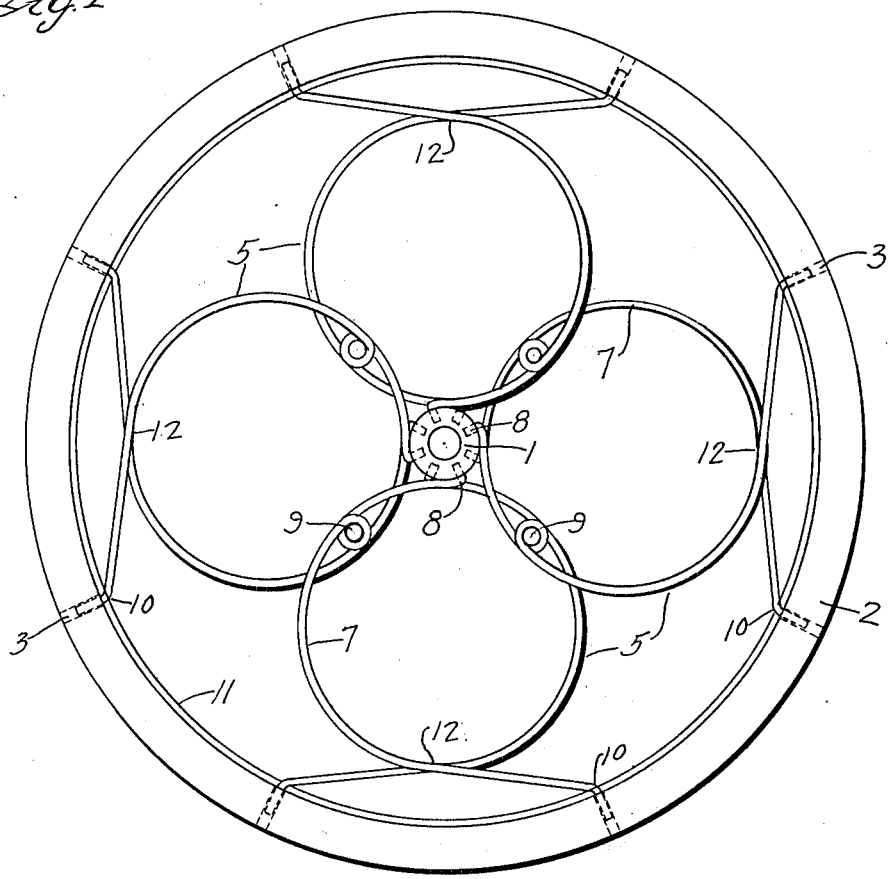
Figure 2:
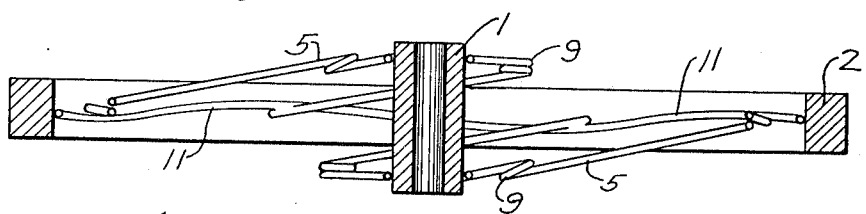
Figure 3:
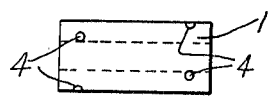

Figure 1 is a side elevation of a spring wheel constructed in accordance with my invention. Fig. 2 is a transverse sectional view; and Fig. 3 is a side elevation of the hub member.

Referring more particularly to the drawings, 1 indicates the hub and arranged in annular spaced relation therewith is the outer rim 2, which is provided with a plurality of circularly arranged spaced openings 3. The hub 1 is provided upon each end thereof with the spaced openings 4, the openings upon each end of the hub being alternately arranged. The spokes 5 of the wheel comprise a single length of resilient material, the intermediate portion of which is arcuately curved, as shown at 7, and one end thereof is bent at right angles, as shown at 8, and disposed within one of the openings 4 of the hub. The spokes 5 are provided adjacent their inner ends with the coils 9, which are formed in the spokes to increase the strength of the same. The outer ends of the spokes are bent at right angles, as shown at 10, and arranged within the openings 3 formed in the outer rim 2. The spokes are secured adjacent their outer ends, by means of solder or other suitable means, to an annulus 11 arranged upon the inner side of the rim 2.

It will be apparent from the accompanying drawings that one set of the spokes which are secured to one end of the hub, face in one direction, while the other set of spokes, which are secured to the opposite end of the hub, face in the opposite direction. The outer ends of the two sets of spokes are adapted to cross each other, as shown at 12, and having their ends arranged upon opposite sides of the annulus 11. It will be apparent that by having the ends of the two sets of spokes arranged upon opposite sides of the annulus 11 it will prevent the lateral movement of the outer ends of the spokes, thus retaining the same within the openings 3.

It is to be particularly observed from reference to Fig. 2 of the drawings that the annulus 11 extends around the inner face of the rim 2 in a tortuous curve, said annulus extending upon relatively opposite sides of the ends of adjacent spokes. As this annulus is not fixed to the wheel rim, the same will spring inwardly to a slight extent from the face of the rim when pressure is brought to bear upon the individual spokes. This movement of the annulus, however, is not sufficient to entirely disengage the outer ends of the spokes from the openings 3, but only yieldably permits the movement of the spokes in said openings.

It will also be apparent that by having two sets of spokes, each set being curved in an opposite direction to the other, it will add greater strength to the wheel and more quickly absorb the shock and jar caused by traveling over rough and uneven roads.

From the above description taken in connection with the accompanying drawings, it will be readily apparent that I have provided a simple and durable spring wheel which will readily absorb any shock or jar caused by traveling over rough roads and which will be readily taken apart and placed together. It will also be apparent that should one of the spokes become worn or broken, it may be quickly and readily removed and be replaced by a new one. It will also be apparent that the wheel in itself is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A spring wheel including a hub and a rim, a plurality of spring spokes having their inner ends fixed to the hub and their outer ends radially movable upon the rim, and a resilient annulus normally engaged upon the inner face of said rim, said annulus extending upon relatively opposite sides of the adjacent spokes and being secured thereto to yieldingly hold the ends of said spokes against movement upon the rim.

2. A spring wheel including a hub and a rim, a plurality of spring spokes fixed at their inner ends to said hub, said rim being provided with a series of radial openings to loosely receive the outer ends of said spokes, and a tortuously curved resilient annulus normally engaged upon the inner face of said rim, said annulus extending upon relatively opposite sides of adjacent spokes and being secured thereto, to yieldingly hold the outer ends of said spokes against radial movement in said openings.

In testimony whereof I hereunto affix my signature in the presence of two witnesses.

THOMAS B. SMITH.

Witnesses:
G. C. CANTRELL,
C. A. ACKERS, Jr.

---

Copies of this patent may be obtained for five cents each, by addressing the "Commissioner of Patents, Washington, D. C."